(12) United States Patent
Dorenkamp et al.

(10) Patent No.: US 8,577,534 B2
(45) Date of Patent: Nov. 5, 2013

(54) METHOD FOR SCANNING A SURROUNDING ENVIRONMENT OF A VEHICLE

(75) Inventors: Stephan Dorenkamp, Ludwigsburg (DE); Volker Brichzin, Ludwigsburg (DE); Ulrich Schirm, Reutlingen (DE); Maria-Eugenia Garcia Bordes, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 859 days.

(21) Appl. No.: 12/308,291

(22) PCT Filed: Sep. 4, 2007

(86) PCT No.: PCT/EP2007/059229
§ 371 (c)(1),
(2), (4) Date: Apr. 30, 2010

(87) PCT Pub. No.: WO2008/043609
PCT Pub. Date: Apr. 17, 2008

(65) Prior Publication Data
US 2010/0332068 A1    Dec. 30, 2010

(30) Foreign Application Priority Data
Oct. 9, 2006  (DE) .......................... 10 2006 047 637

(51) Int. Cl.
*G01C 22/00*   (2006.01)
*G05D 1/00*    (2006.01)
*G05D 1/02*    (2006.01)

(52) U.S. Cl.
CPC ............. *G05D 1/0272* (2013.01); *G05D 1/027* (2013.01); *G05D 1/0278* (2013.01); *G05D 2201/0216* (2013.01); *G05D 1/0255* (2013.01)
USPC .......... 701/23; 701/1; 701/2; 701/26; 701/27; 701/28; 701/29.3; 701/30.1; 701/30.2; 701/30.3; 701/30.9; 701/31.1; 701/31.3; 701/31.7; 701/32.3; 701/38; 701/43; 701/76; 701/79; 701/80; 701/96; 701/97; 701/98; 701/116; 701/117; 701/118; 701/119; 701/121; 701/122; 701/411; 701/414; 701/415; 701/423; 340/435; 340/436; 340/438; 340/903; 180/167; 180/169; 180/179; 382/103; 382/104

(58) Field of Classification Search
USPC ........... 701/1, 29, 118, 403, 2, 23, 26, 27, 28, 701/29.8, 30.1, 30.2, 30.3, 30.8, 30.9, 31.1, 701/31.3, 31.7, 32.3, 38, 43, 76, 79, 80, 96, 701/97, 98, 116, 117, 119, 121, 122, 411, 701/414, 415, 423; 340/435, 436, 438, 903; 180/167, 169, 179; 382/103, 104
See application file for complete search history.

(56) References Cited

U.S. PATENT DOCUMENTS 5,014,200 A * 5/1991 Chundrlik et al. ............... 701/96
5,283,813 A * 2/1994 Shalvi et al. .................... 375/230
(Continued)

FOREIGN PATENT DOCUMENTS

| | | |
|---|---|---|
| DE | 199 48 252 | 6/2001 |
| EP | 1 485 268 | 12/2004 |
| WO | WO 03/078195 | 9/2003 |

*Primary Examiner* — Helal A Algahaim
*Assistant Examiner* — James E Stroud
(74) *Attorney, Agent, or Firm* — Kenyon & Kenyon LLP

(57) ABSTRACT

A method and a device are described for scanning the surrounding environment of a vehicle. When the vehicle falls below a first boundary speed a timer is triggered whose state is incremented until the vehicle exceeds a boundary speed, a check of the unobstructed view of the scanning device being carried out upon expiration of the time period recorded by the state of the timer and in which the state of the counter is incremented.

11 Claims, 2 Drawing Sheets

(56) References Cited

U.S. PATENT DOCUMENTS

| | | | |
|---|---|---|---|
| 5,428,545 A * | 6/1995 | Maegawa et al. | 701/423 |
| 5,483,453 A * | 1/1996 | Uemura et al. | 701/23 |
| 5,508,925 A * | 4/1996 | Katayama et al. | 701/93 |
| 5,521,633 A * | 5/1996 | Nakajima et al. | 348/118 |
| 5,572,428 A * | 11/1996 | Ishida et al. | 701/301 |
| 5,623,259 A * | 4/1997 | Giangardella | 340/932.2 |
| 5,626,535 A * | 5/1997 | Kono et al. | 477/169 |
| 5,646,612 A * | 7/1997 | Byon | 340/903 |
| 5,777,563 A * | 7/1998 | Minissale et al. | 340/903 |
| 5,901,806 A * | 5/1999 | Takahashi | 180/170 |
| 6,223,117 B1 * | 4/2001 | Labuhn et al. | 701/93 |
| 7,512,489 B2 * | 3/2009 | Endo et al. | 701/414 |

\* cited by examiner

METHOD FOR SCANNING A SURROUNDING ENVIRONMENT OF A VEHICLE

BACKGROUND OF THE INVENTION

1. Field of the Invention

The present invention relates to a method, a device, and a computer program product for scanning a surrounding environment of a vehicle, in particular a motor vehicle.

2. Description of Related Art

In systems and methods for adaptive speed regulation (ACC: adaptive cruise control), distance determination and distance control methods are used to enable monitoring of distances between individual vehicles so that critical traffic situations can be avoided. For the distance determination, e.g. radar (radio detection and ranging) or lidar (light detection and ranging) systems are used.

Known ACC methods thus ensure, inter alia, that at all times the proper distance is maintained from a vehicle traveling in front. However, a problem can result if the unobstructed sight line of the scanning device is no longer present, due for example to reduced light conditions or unfavorable weather conditions. In this case, the scanning device or ACC system must be deactivated. In order to determine whether the scanning device has an unobstructed view, i.e. whether the system can "see" or is "blind," what are known as blind algorithms are used that are executed at regular time intervals or are triggered by particular events. In this way, it is ensured that the automatic speed regulation is carried out only given the presence of reliable data concerning other traffic participants.

ACC systems of the new generation, known as "ACC plus" systems, expand the range of use of the systems to include travel speeds down to standstill of the vehicle. Thus, it is necessary to develop ACC systems and scanning devices or scanning methods that use blind algorithms that, possibly together with additional algorithms, ensure reliable blindness recognition or acquisition at low speeds.

BRIEF SUMMARY OF THE INVENTION

The method according to the present invention is used to scan a surrounding environment of a vehicle, and is provided in particular for use in a motor vehicle. For this purpose, the method uses a scanning device, such that when the vehicle falls below a first boundary speed a timer is triggered whose state is incremented until the vehicle exceeds a second boundary speed, a check of the unobstructed view of the scanning device being carried out upon expiry of a time period that is recorded by the state of the timer and in which the state of the counter is incremented.

The blind algorithm realized by the described method therefore checks the unobstructed view of a vehicle while this vehicle is within a prespecifiable speed range, standardly a range of low speed. Thus, this algorithm can be used in particular at low speeds, and, in combination with the existing blind algorithm, represents a more reliable blind acquisition in the overall ACC speed range.

If the testing of the unobstructed view of the scanning device yields the result that the view is obstructed, the scanning device is to be deactivated. If the result is that the view is unobstructed, the scanning device is not deactivated. In this case, the timer is standardly reset.

After the vehicle exceeds the second boundary speed, and before the time period has elapsed, the timer is reset. This means that as soon as the vehicle moves outside the speed range of interest, this blind algorithm will not trigger a testing of the unobstructed view.

In the design of the method, the first boundary speed, the second boundary speed, and/or the time period can be set, or parametrized. A suitable value for the first speed has turned out to be 15 km/h; for the second speed, 0.5 km/h has proven suitable, and for the time period of the timer a value of 300 seconds has turned out to be suitable. Of course, other values can also be specified here.

The described method is used for example when there is a distance measurement, and in particular in the context of an adaptive speed regulation. In this way, it is ensured that tests of the unobstructed view are carried out in the ACC system over the entire range of speed of the vehicle, all the way down to vehicle standstill, at specifiable points in time.

The presented unit, in particular an electronic unit, is used to scan a surrounding environment of a motor vehicle, and in particular to carry out a method as described above. The unit has a scanning device and a timer whose state is incremented when the vehicle falls below a first boundary speed and until the vehicle exceeds a second boundary speed, the scanning device carrying out a testing of the unobstructed view upon expiry of a time period that is recorded by the state of the timer and in which the state of the timer is incremented.

The presented device typically has a computing unit for carrying out the method described above. The timer is allocated to this computing unit, i.e., the computing unit can read the state of the timer.

The computer program according to the present invention has program code for the execution of all steps of a method according to the present invention when the computer program is running on a computer or a corresponding computing unit, in particular in a unit of the type described above.

The computer program product according to the present invention has this same program code, stored on a computer-readable data medium, so that all steps of a method described above are to be executed when the computer program is executed on a computer or a corresponding computing unit, in particular in a unit as described above.

Thus, a possible specific example embodiment of the method according to the present invention provides that, in a vehicle having an ACC system, the present blind acquisition algorithm is used at speeds lower than 15 km/h. A timer is started as soon as the speed of the vehicle falls below a parametrizable speed, e.g. 0.5 km/h. As long as the speed of the vehicle does not exceed another parametrizable speed, in this case 15 km/h, the counter, i.e. its state, is incremented. As soon as the speed of the vehicle exceeds this upper speed boundary, the timer is reset, and is not incremented again until the speed of the vehicle again falls below the lower speed boundary, in this case 0.5 km/h.

When the time counter exceeds a parametrizable time period, e.g. 300 seconds, a test of the unobstructed view is carried out. If this test yields the result that the unobstructed view is not available, the scanning device or ACC system is deactivated. It is then possible to repeat the test at determined time intervals, in particular cyclically, until the unobstructed view is again available. The ACC system can then be reactivated. Advantageously, the driver is informed of this.

As soon as the test yields the result that the unobstructed view is available, the timer is advantageously reset and is not triggered again until the speed of the vehicle again falls below the lower speed boundary, in this case 0.5 km/h.

The test of the unobstructed view includes a measurement of acquired objects. It is a goal here to be able to measure an object that is continuously situated at a minimum distance during a particular time period. The test is carried out successfully if the system is able to measure at least one object that meets these requirements.

The presented method consequently provides a new blind algorithm that, together with additional algorithms, ensures a reliable use of an ACC system in the entire speed range.

The unit according to the present invention, implemented in hardware, in software, or as a unit in hardware and software, can be installed in a suitable location in the vehicle without great expense.

Of course, the above-named features, further explained below, can be used not only in the indicated combinations, but also in other combinations, or by themselves, within the scope of the present invention.

DETAILED DESCRIPTION OF THE INVENTION

Figure 1:
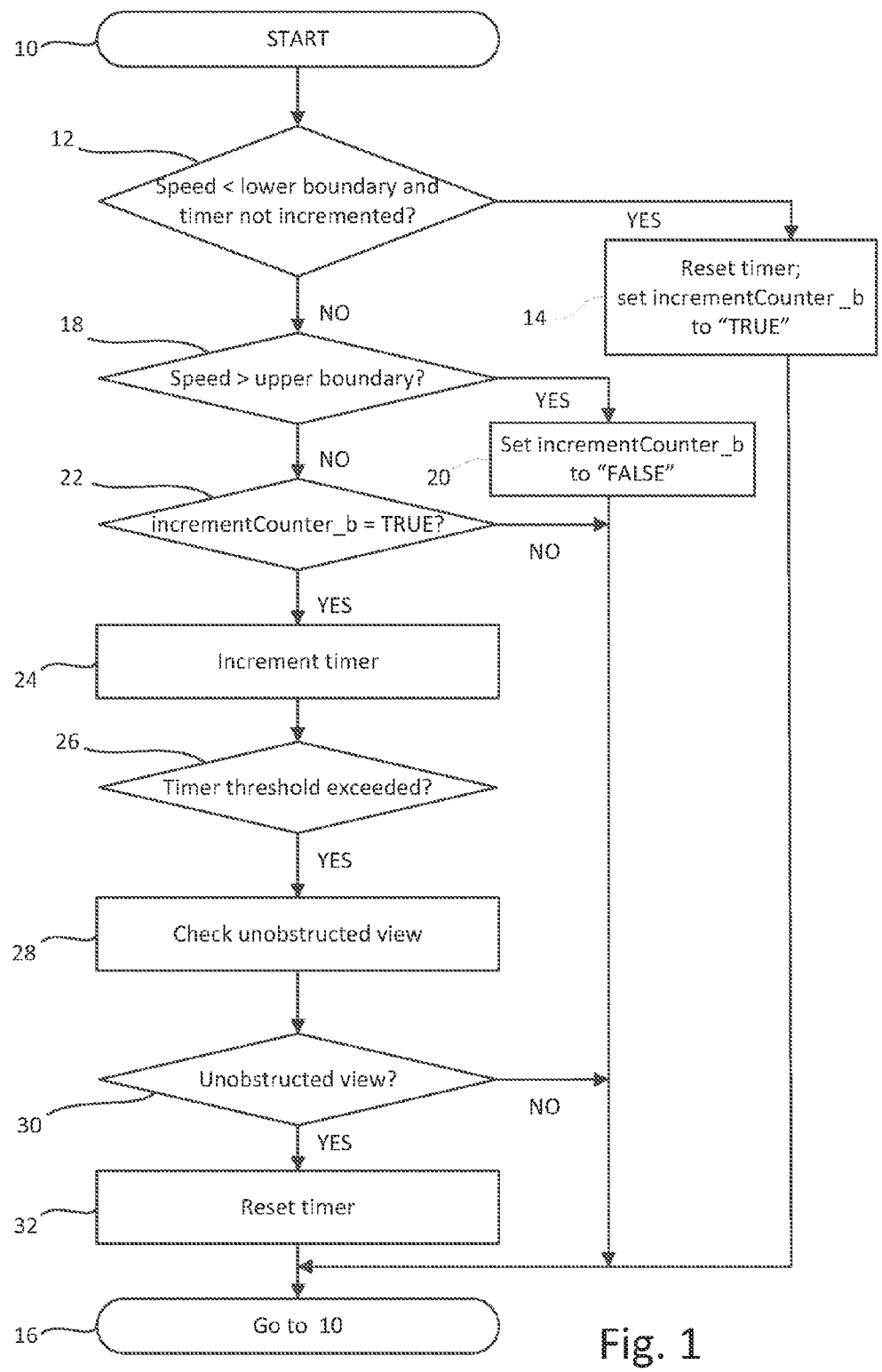
FIG. 1 shows, in a flow diagram, a possible specific embodiment of the method according to the present invention.

FIG. 1 shows a possible specific example embodiment of the method according to the present invention in a flow diagram. In a first step 10, the algorithm for checking a clear view at low speed starts. First, in a step 12 it is checked whether the speed of the vehicle is less than 0.5 meters per hour AND whether the timer is not incremented, i.e. whether a variable incrementCounter_b is set to "FALSE." If this is the case, in a step 14 the timer is reset to 0, and the variable incrementCounter_b is set to "TRUE." Finally, in a step 16 a jump take place to step 10.

If the result of the check in step 12 is "no," in a step 18 it is checked whether the speed is greater than 15 km/h. If this is the case, in a step 20 the variable incrementCounter_b is set to "FALSE." Via step 16, a jump takes place to step 10.

If the check in step 18 yields the result that the speed of 15 km/h has not been exceeded, in a step 22 it is checked whether the variable incrementCounter_b is "TRUE." If this is not the case, a jump takes place to step 16. Otherwise, in a step 24 the timer is incremented. This takes place until the timer exceeds the preset threshold of 300 seconds. This check takes place in a step 26. If the time threshold is exceeded, in a step 28 the check of the unobstructed view takes place.

If the check (step 30) yields the result that an unobstructed view is available, in a step 32 the timer is reset to 0. The jump to step 10 subsequently takes place via step 16. If the check in step 30 yields the result that an unobstructed view is not available, a jump takes place directly to step 16.

The values cited in this exemplary embodiment for the boundary speed and the time period are cited only as examples, and can be adapted as needed.

Figure 2:
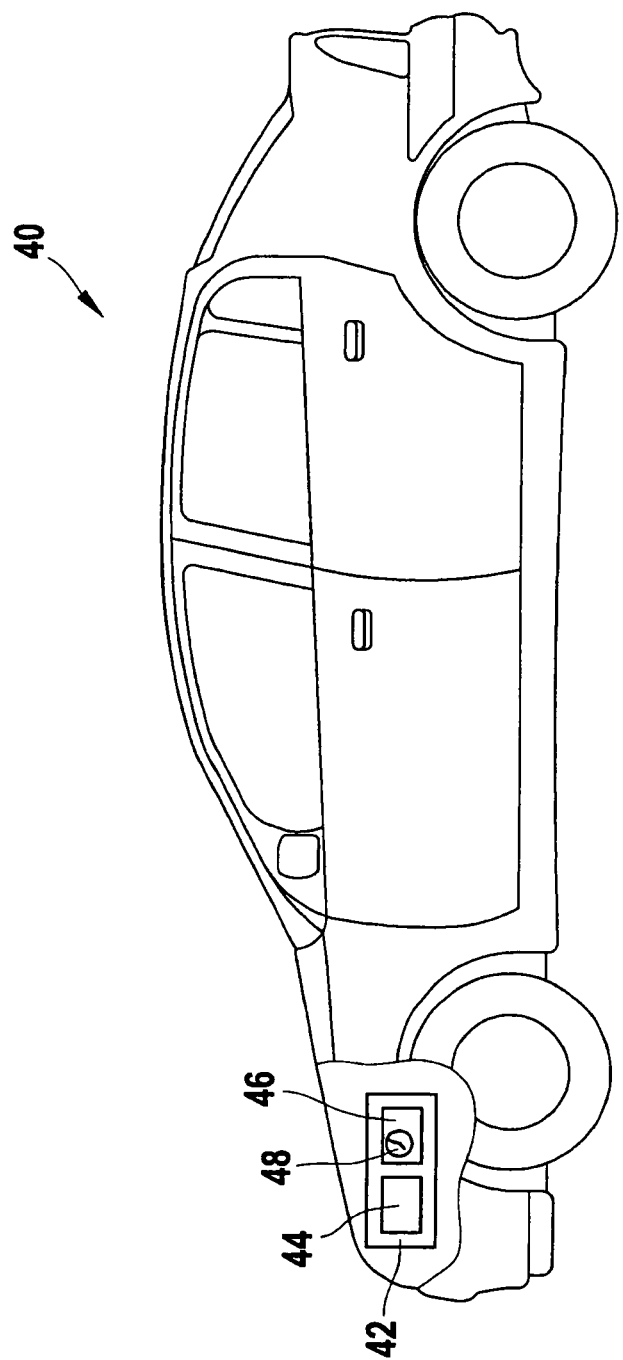
FIG. 2 shows a motor vehicle having a possible specific embodiment of the device according to the present invention.

FIG. 2 shows a vehicle 40 in which an ACC system is used. In vehicle 40, a unit 42 is provided for scanning a surrounding environment of vehicle 40. This unit is used in particular to carry out the method described in connection with FIG. 1.

Unit 42 has a scanning device 44 and a computing device 46. In this computing device 46, there is provided a timer 48 that is designed to acquire a time period in which vehicle 40 is moving within a certain speed range.

After the expiration of the specifiable time period, there then takes place the check of whether scanning device 44 has an unobstructed view available or not. As long as the unobstructed view is not available, the ACC system is deactivated, so that a safer operation of vehicle 40 is ensured in the specified speed range as well. The activation of the ACC system takes place automatically in this embodiment as soon as the unobstructed view of scanning device 44 has been confirmed.

What is claimed is:

1. A computer-implemented method for scanning a surrounding environment of a vehicle using a scanning device of the vehicle, comprising:
    at a processor of a computer, triggering a timer when a speed of the vehicle falls below a first predefined boundary speed;
    incrementing a count of the timer while the timer is triggered, until the speed of the vehicle exceeds a second predefined boundary speed that is greater than the first predefined boundary speed; and
    responsive to the count reaching a specified value corresponding to a predefined time period measured from when the timer was triggered, determining by the processor whether the scanning device is able to measure at least one object to within a specified performance requirement.

2. The method as recited in claim 1, further comprising: deactivating the scanning device by the processor in response to determining that the scanning device is unable to measure at least one object to within the specified performance requirement.

3. The method as recited in claim 1, further comprising: resetting the timer by the processor in response to determining that the scanning device is able to measure at least one object to within the specified performance requirement.

4. The method as recited in claim 1, further comprising: resetting the timer if the speed of the vehicle exceeds the second predefined boundary speed.

5. The method as recited in claim 2, further comprising: resetting the timer if the speed of the vehicle exceeds the second predefined boundary speed.

6. The method as recited in claim 3, further comprising: resetting the timer if the speed of the vehicle exceeds the second predefined boundary speed.

7. The method as recited in claim 3, further comprising: performing a distance measurement using the scanning device.

8. The method as recited in claim 7, further comprising: using the distance measurement in an adaptive speed regulation.

9. A system for scanning a surrounding environment of a motor vehicle, comprising:
    a scanning device positioned one of in or on the motor vehicle; and
    a timer configured to be triggered when a speed of the motor vehicle falls below a first predefined boundary speed, and wherein a count of the timer is incremented while the timer is triggered, until the speed of the vehicle exceeds a second predefined boundary speed that is greater than the first predefined boundary speed;
    wherein the scanning device is configured to, responsive to the count reaching a specified value corresponding to a predefined time period measured from when the timer was triggered, determine whether the scanning device is able to measure at least one object to within a specified performance requirement.

10. A non-transitory computer-readable data-storage medium storing a computer program having a plurality of program codes which, when executed on a computer, controls a method for scanning a surrounding environment of a vehicle using a scanning device of the vehicle, the method comprising:

- at a processor of the computer, triggering a timer when a speed of the vehicle falls below a first predefined boundary speed;
- incrementing a count of the timer while the timer is triggered, until the speed of the vehicle exceeds a second predefined boundary speed that is greater than the first predefined boundary speed; and
- responsive to the count reaching a specified value corresponding to a predefined time period measured from when the timer was triggered, determining by the processor whether the scanning device is able to measure at least one object to within a specified performance requirement.

11. The method as recited in claim 1, wherein the performance requirement includes the scanning device being able to successfully measure an object that is continuously situated at a minimum distance during a specified time period.

* * * * *

UNITED STATES PATENT AND TRADEMARK OFFICE
CERTIFICATE OF CORRECTION

PATENT NO.      : 8,577,534 B2                                Page 1 of 1
APPLICATION NO. : 12/308291
DATED           : November 5, 2013
INVENTOR(S)     : Dorenkamp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1246 days.

Signed and Sealed this
Twenty-second Day of September, 2015

Michelle K. Lee
*Director of the United States Patent and Trademark Office*